Patented Oct. 16, 1923.

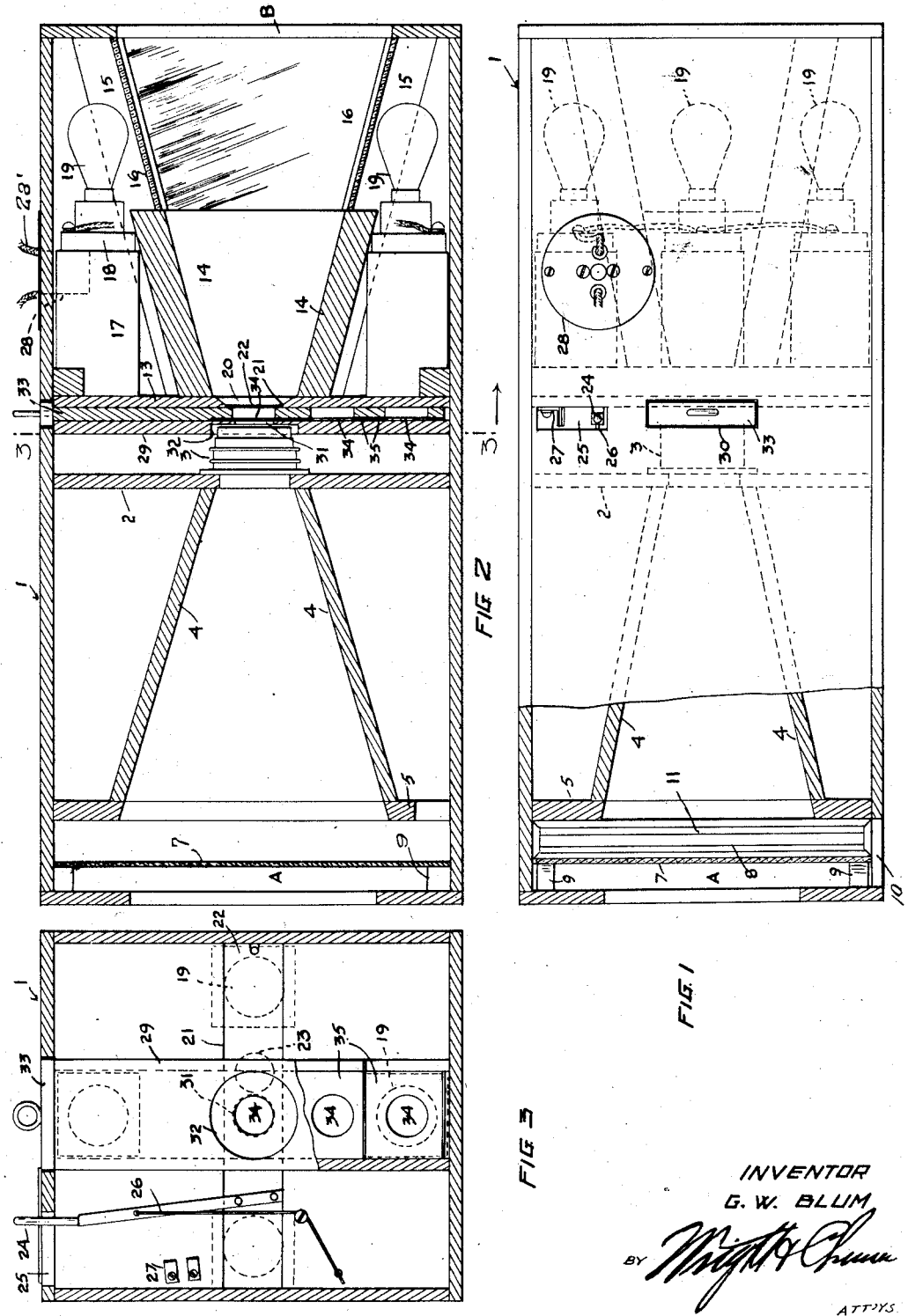

1,470,708

UNITED STATES PATENT OFFICE.

GEORGE W. BLUM, OF SAN FRANCISCO, CALIFORNIA.

CAMERA.

Application filed March 6, 1922. Serial No. 541,347.

*To all whom it may concern:*

Be it known that I, GEORGE W. BLUM, a citizen of the United States, residing at San Francisco, in the county of San Francisco and State of California, have invented new and useful Improvements in Cameras, of which the following is a specification.

This invention relates to improvements in cameras of the type adapted for photographing finger prints, legal documents and the like, and for copying or retaking photographs, pictures, etc.

The primary object of the invention is to provide a camera of the character described which will be superior to similar cameras heretofore used, in point of simplicity and inexpensiveness of construction, accuracy and facility of operation, also in that true color values may be photographed and particularly, due to the provision of a novel form of finder and a means for automatically producing the necessary illumination coincident with the opening of the shutter.

Another object of the invention is to provide a novel color filter device which may be readily inserted in a novel manner into the camera to provide for photographing color values.

Another object is to provide a novel, inexpensive and effective means for producing the necessary artificial light with electric lights in which a circuit closer for lights is closed when the shutter is opened, and opens when the shutter is closed by simply operating the shutter button or lever.

The invention possesses other advantages and features some of which, with the foregoing will be set forth at length in the following dscription where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:

Fig. 1 represents a top plan view of the camera of my invention showing the case broken away and parts shown in section and in dotted lines.

Fig. 2 represents a longitudinal vertical sectional view of the camera, the sensitized plate and holder being omitted.

Fig. 3 represents a section taken on the plane of line 3—3 of Fig. 2.

Referring to the embodiment of the invention shown in the accompanying drawing, 1 designates an elongated camera casing which is open at both ends and provided centrally with a partition 2. A suitable photographic lens 3 is mounted in the partition 2. Divergent walls 4 extend from points close to the lens on the partition 2 to points near but spaced from one end of the casing and are joined to short walls 5 extending inwardly from the casing 1. There are provided similar short walls 6 at the adjacent open end whereby the opening at said end is of less size than the diameter of the casing and whereby there will be provided a space A to receive a ground glass 7 and a sensitized plate holder 8. The ground glass is held in place extending across the space A at a point spaced inwardly from the adjacent open end of the casing by suitable means 9. The plate holder or frame 8 is removable and is adapted to be inserted into the casing thru a slot 10 formed in one side thereof, so as to lie between the ground glass and walls 5 with the sensitized plate 11 exposed at the outer end of the space between the divergent walls 4.

The space in the casing forward of the partition 2 is adapted to contain the shutter and illuminating unit which comprises a frame 12 consisting of a rear wall or plate 13 and four walls 14 which latter extend outwardly from the wall 13 divergently to short inwardly extending walls 15 on the adjacent end of the casing. The walls 15 provide an opening in this end of the casing corresponding in size to the opening at the walls 5. The divergent walls 14 are opaque from their inner ends to points centrally of their ends and otherwise are formed of clouded glass sections 16. Extending from the rear wall 13 along the outer side of the opaque portion of each wall 15 is a socket support 17 having an incandescent lamp socket 18 in its outer end. By this arrangement four lamps 19 may be disposed close to the outer sides of the clouded glass sections 16 of the walls 14. The lamps thus disposed will provide for proper illumination of the subject photography, which subject will be held or disposed at the opening B at the front end of the casing 1.

The rear wall or plate 13 is provided with a shutter opening 20 alining with the lens 3 and has a shutter groove 21 in its rear face. A shutter 22 is slidable in the groove and has an opening 23 therein adapted to move into and out of registration with the opening 20. A handle 24 is fixed to the shutter and extends upwardly thru a slot 25 in the upper wall of the casing 1. A spring 26 is fixed to the wall 13 and to the handle so that in moving the handle to slide the shutter into open position the spring is flexed and when the handle is released said spring returns the shutter to closed position.

A circuit closer 27 is operatively associated with the handle and is closed when the handle is moved into position to open the shutter, whereas said closer opens when the shutter moves into closed position. The circuit closure is electrically connected in any suitable manner with the incandescent lights and with a plug socket 28 which opens upon the outside of the upper wall of the casing. A suitable wire cord and plug 28' may be used to electrically connect the camera with the ordinary household or office electric light socket, not shown. With this arrangement the circuit for the lights is closed simultaneously with the opening of the shutter and opens immediately when the shutter is closed. This provides for a saving in electrical energy, as the lights are used only while the shutter is open, but momentarily.

There is provided a guide member 29 on the rear face of the wall 13, which guide registers at its upper open end with a slot or opening 30 in the upper wall of the casing 1. This guide has an opening 31 therein registering with the shutter openings and the lens, there being a recess 32 in the rear face of the guide around said opening 31, which recess receives the projecting part of the lens 3. A color filter slide 33 is adapted to be inserted into the guide 29 thru the opening 30 and fits snugly in the guide so that it will be self-supporting therein, in any one of a number of positions. The slide has a plurality of spaced openings 34 therein, each opening having a slot in one side so as to permit the insertion of a colored glass plate 35 into said opening. In this way the slide may be used to support three differently colored screens or plates, each plate being removable so that a plate or screen of a different color may be inserted.

By adjusting the slide the plate having the desired color may be brought between the lens and shutter so that the image will filter thru the colored glass before passing thru the lens. Thus where color values are desired by use of the color filter I may obtain true color values in the negative photographic plate.

In using the camera, the open end B is placed over or against the object, such as a bank check or finger print bearing object, and by looking into the opening at the rear end of the camera the image will be shown upon the ground glass 7 as projected by the lens.

When the shutter is opened the circuit closer is operated to close the circuit for the lamps and the lamps will be illuminated as long as the shutter is held open. When the camera is in the right position relative to the object to be photographed or vice-versa, the shutter is allowed to close and the sensitized plate is slipped into place thru the opening in the side of the camera. By then opening the shutter the lamps will be illuminated and the image recorded on the sensitized plate in the usual manner. If color values in the object are to be brought out, the operator may determine the necessary color filter by first sighting thru the ground glass with the sensitized plate removed from the camera. By adjusting the slide the glass having the desired color may be brought into proper position to filter and provide for recording the desired color value on the sensitized plate.

I claim:

1. A camera comprising an elongated casing open at both ends, a partition extending across a mediate part of the casing, a lens within the partition, a glass plate extending across the casing adjacent to one end thereof and rearwardly of the lens, said casing having a space therein adjacent to said plate into which space a photographic sensitized element is adapted to be mounted, a shutter disposed in front of the lens, illuminating means within the casing, a color filter slide adapted to be inserted into the casing, said casing having an opening therein thru which the slide is insertable, said slide having a colored plate thereon adapted to be moved into alinement with the lens and shutter.

2. A camera comprising an elongated casing open at both ends, a partition extending across a mediate part of the casing, a lens within the partition, a translucent glass plate extending across the casing adjacent to one end thereof and rearwardly of the lens, said casing having a space therein adjacent to said plate into which space a photographic sensitized element is adapted to be mounted, a plate disposed in front of the partition and close thereto, a shutter carried by said plate and registering with the lens, a plurality of walls extending from the plate to the other end of the casing, said walls having translucent portions, a plurality of electric lamps between the translucent portions of the walls and said casing and an electrical circuit for said lamps.

3. A camera comprising an elongated casing open at both ends, a partition extending across a mediate part of the casing, a lens within the partition, a translucent glass plate extending across the casing adjacent to one end thereof and rearwardly of the lens, said casing having a space therein adjacent to said plate into which space a photographic sensitized element is adapted to be mounted, a plate disposed in front of the partition and close thereto, a shutter carried by said plate and registering with the lens, a plurality of walls extending from the plate to the other end of the casing, said walls having translucent portions, a plurality of electric lamps between the translucent portions of the walls and said casing, an electrical circuit for said lamps, means for opening and closing the shutter and a circuit closer for the electrical circuit associated with said shutter operating means and arranged to close the circuit when the shutter is open and to open the circuit when the shutter is closed.

4. A camera comprising a casing having openings at opposite ends, a lens located within the casing between said openings, a glass plate in said casing adjacent one of the openings, means of illumination within the casing adjacent the other opening arranged to illuminate the subject of photography when said last named opening is brought in close proximity to the subject, means providing for the disposal of the photographic sensitized element between said glass plate and lens and a shutter co-operating with the lens.

5. A camera comprising a casing having openings at opposite ends, a lens located within the casing between said openings, a glass plate in said casing adjacent one of the openings, means of illumination within the casing adjacent the other opening arranged to illuminate the subject of photography when said last named opening is brought in close proximity to the subject, means providing for the disposal of the photographic sensitized element between said glass plate and lens, a shutter cooperating with the lens and a color filter device removably mounted in the casing with its color filter in registration with the lens.

GEORGE W. BLUM.